Nov. 20, 1956   E. J. PANISH   2,771,168
CLUTCH AND THROTTLE CONTROL FOR ENGINE
Filed June 27, 1952   3 Sheets-Sheet 1
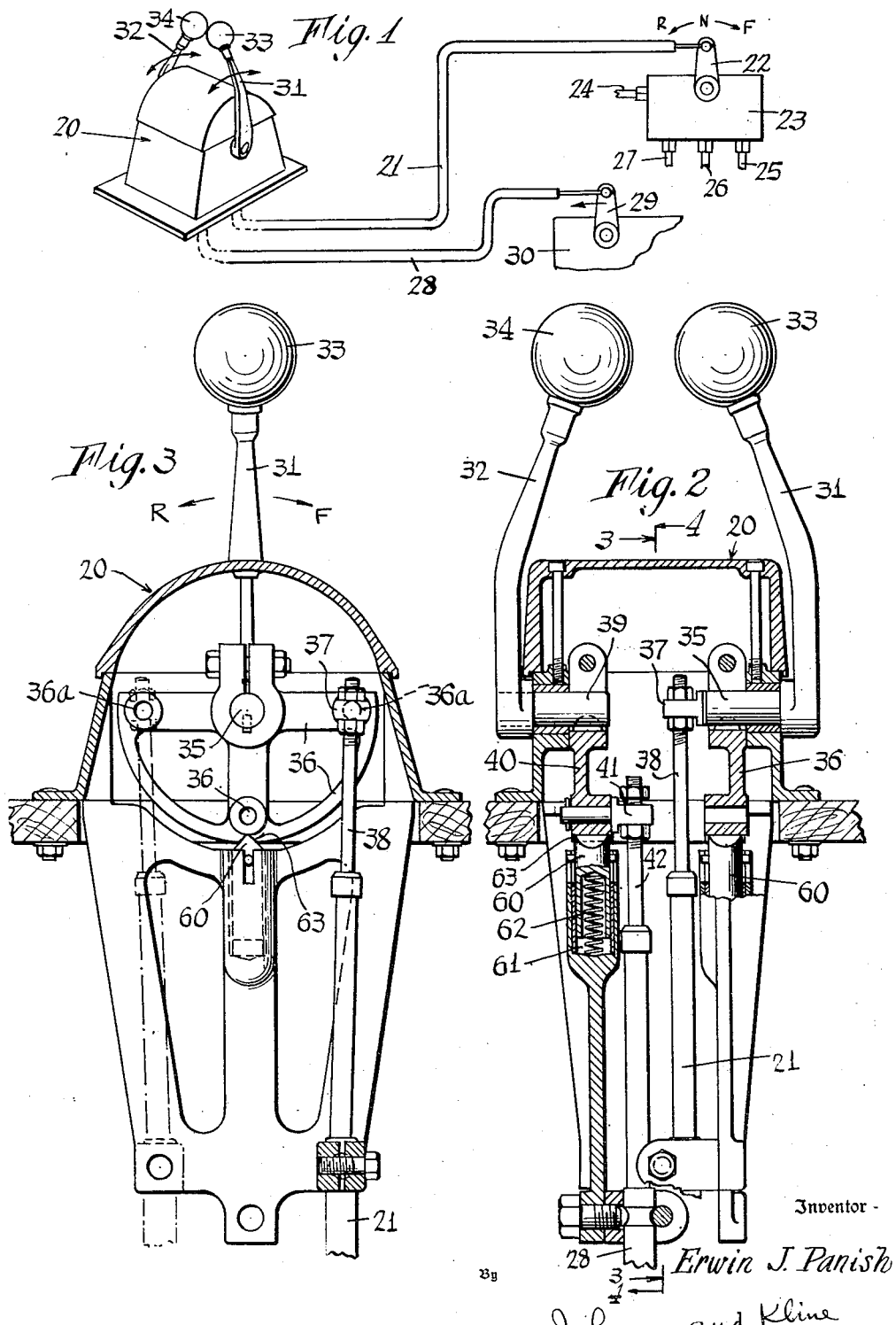
Inventor -
Erwin J. Panish
By Johnson and Kline
Attorneys Nov. 20, 1956  E. J. PANISH  2,771,168
CLUTCH AND THROTTLE CONTROL FOR ENGINE
Filed June 27, 1952  3 Sheets-Sheet 2
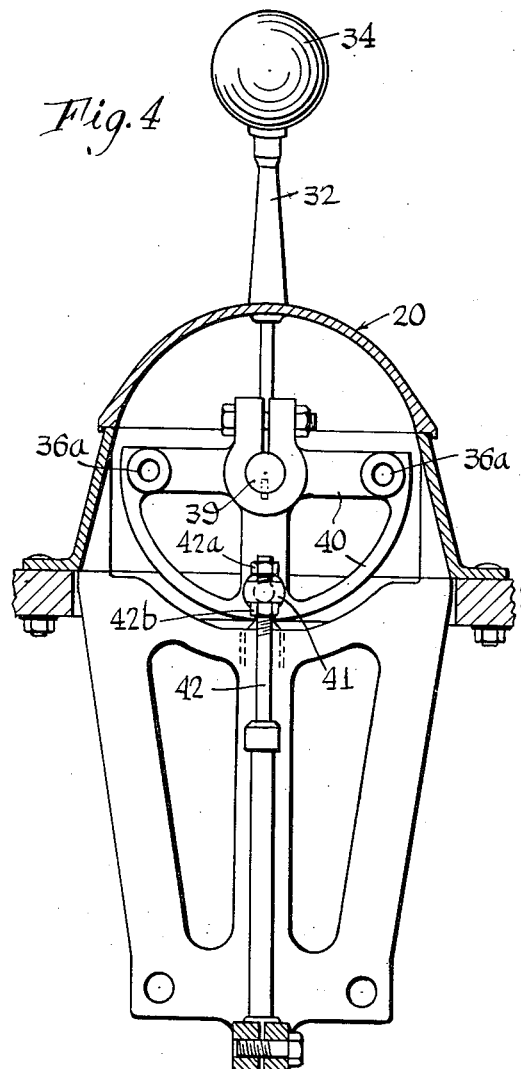
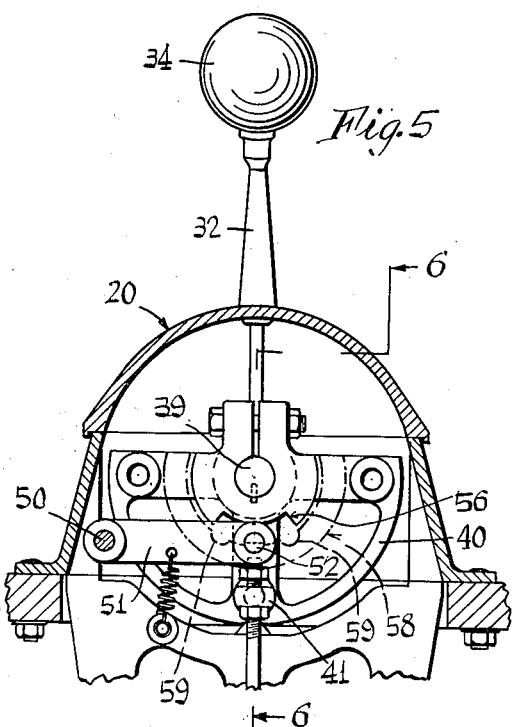
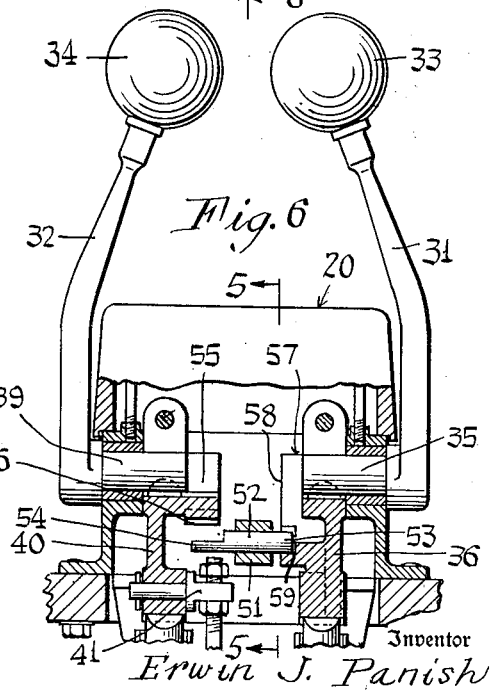
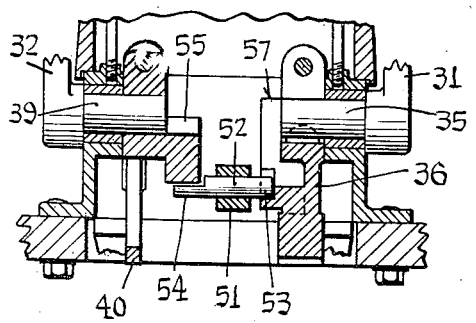
Inventor
Erwin J. Panish
By Johnson and Kline
Attorneys Nov. 20, 1956 — E. J. PANISH — 2,771,168
CLUTCH AND THROTTLE CONTROL FOR ENGINE
Filed June 27, 1952 — 3 Sheets-Sheet 3
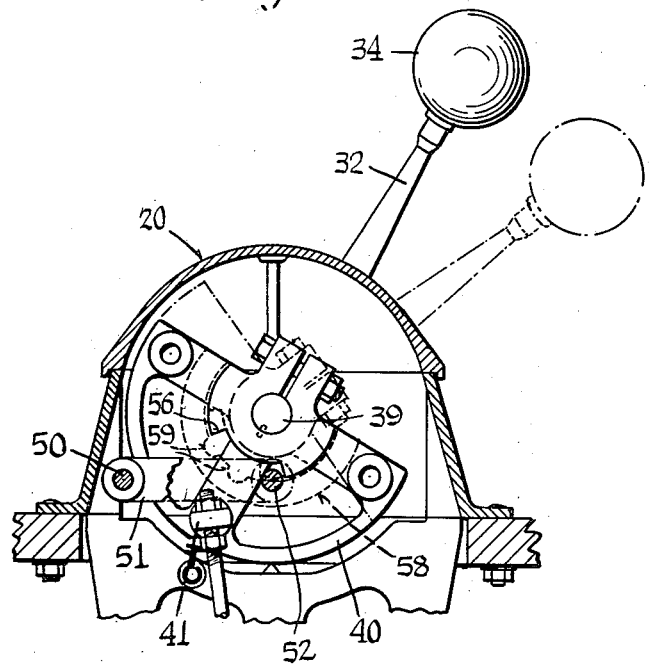
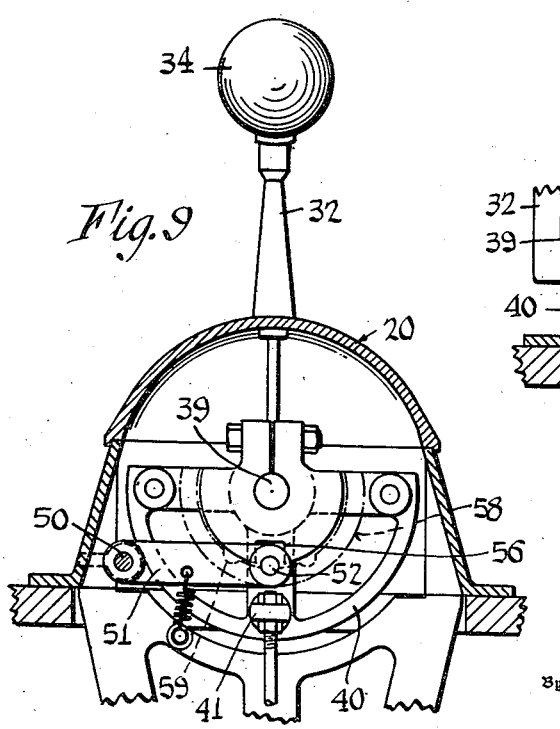
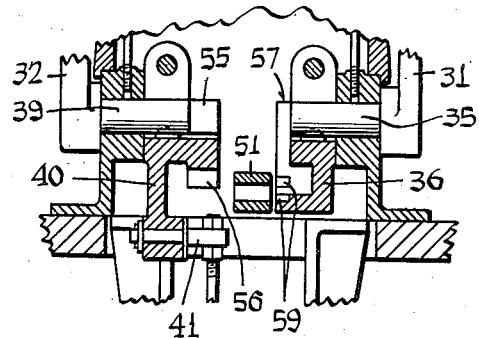
Inventor
Erwin J. Panish
By Johnson and Kline
Attorneys

United States Patent Office 2,771,168
Patented Nov. 20, 1956

2,771,168

CLUTCH AND THROTTLE CONTROL FOR ENGINE

Erwin J. Panish, Bridgeport, Conn.

Application June 27, 1952, Serial No. 295,955

21 Claims. (Cl. 192—.096)

This invention relates to remote controls, and more particularly to controls for operating by hand-applied power the reverse gear and clutch mechanism and the throttle of an internal combustion engine such as that of a motor boat and like vehicle.

An object of this invention is to provide a relatively inexpensive remote control which has many of the advantages of hydraulically or electrically operating remote controls and, in addition, the advantages of sure and positive action, of instantaneous response, freedom from power failures, and each of installation and maintenance.

Heretofore, it has been common practice to make mechanical connections from the engine controls to levers on the bridge or other remote points, but the levers connected to the clutch and reverse gear and to the throttle were placed with respect to each other and other things according to whim or fancy, were disassociated and were not arranged for one-hand operation.

Frequently in operating a boat to avoid a collision or other casualty, it is necessary to instantly slow down the engines, reverse the direction of rotation of the propeller and speed up the engine to stop or reverse the direction of travel of the boat. With the manual controls heretofore used, this was an operation that required extreme care in performing the various steps in proper order or sequence, otherwise great damage to the engine could be caused, and the desired maneuvers fail to be performed. For instance, if the vessel were proceeding ahead at cruising speed and an emergency reverse was required, the operator would first have to place his hand on one lever and operate it in the correct direction to throttle down the engine, then grasp the other lever and operate it to shift from ahead to astern, and then again operate the throttle lever to speed up the engine. If the operator should inadvertently operate the clutch lever to disengage the clutch before the engine was retarded, the engine, being suddenly free of its load, would race at such excessively high speed that it might be damaged or destroyed. But, even if this did not happen, when the reverse gear clutch was thrown in, the excessive speed of the engine would cause the clutch to slip and not hold at all with the result that the vessel would continue forward by its momentum unchecked by reverse action, and probably the clutch would be damaged. The presence of mind and dexterity required of the operator to perform such a maneuver is further intensified if a hard-over rudder is required at the same time, for the operator has his two hands busy with the control. The inability to successfully perform such a maneuver has caused many accidents.

Not only is the two-hand operation a problem in emergencies, it is a problem in the ordinary maneuvering of the vessel as in coming about in a narrow channel or stream, for, while this operation can be performed with less mental and physical tension, it requires a quick and prompt sequence of operation of the throttle and clutch, and of the rudder, to be successfully completed, especially in the presence of adverse currents or wind.

A feature of this invention is the provision of a unitary control station having juxtaposed handles operable by one and the same hand if desired, one for throttling the engine and one for stopping and going forward or astern with mechanical power transmission connections, such as push-pull cables, to the throttle and gear and clutch operating mechanism of the engine.

Another feature of the invention is the provision of an improved wholly mechanical clutch and throttle control device wherein unidirectional movement of the levers controls the clutch and/or the throttle either for ahead or astern operation. According to the present invention, the control handles are so placed and connected to the throttle and to the clutch and reverse gear mechanism that they are moved in obvious directions from whatever positions they occupy at the time, the reverse gear control handle being moved forwardly for forward travel and rearwardly for travel astern, and the handle for the throttle accelerating the engine in moving in either forward or rearward direction from neutral position.

In carrying out the invention, the control comprises a suitable housing and supporting parts and two handles, one for the throttle and the other for the clutch-reverse gear. Each handle is connected to a segment, and the segments may be alike so that either may be connected to the throttle operating connections or to the reverse gear operating connections.

The throttle handle normally stands upright and the throttle linkage is connected to a segment diametrically opposite to the handle so that in both directions of movement of the segment from "closed" position, the throttle connections are moved in the same direction to "open" positions. The segment has two mounting holes on opposite sides of its center for receiving operating connections to the reverse gear. One or the other of these holes or mounting sockets is used to receive the operating connection to the reverse gear depending on the direction in which the reverse gear lever at the engine is operated to go ahead so that the reverse gear handle may be forward when the gear is in "ahead" position. Each segment also has a notch engaged by a detent for yieldably holding the handle in neutral upright position.

With this arrangement it will be seen that either lever and segment may be used for either the throttle control or the reverse gear control according to the way it is connected to the push-pull cables or other mechanical connections to the engine. In a twin engine control, the two throttle levers, for instance, may be adjacent, thus facilitating convenient maneuvering of the vessel by controlling the speeds of the engines and hence of the propellers without operating the clutch and reverse gear handles located outside of the throttle handles.

The fact that the handles, segments and mounting means are the same for each kind of control makes for simplicity and economy of manufacture and repair, since duplicate parts can be used for both purposes.

Another feature of this invention is the provision of means for adjusting the connections between the throttle and the control segment so that the idling speed of the engine may be varied as desired without adjusting any connections at the engine. This is particularly important in a twin engine installation, for it permits close synchronization of the engines with the throttle handles in like positions by a very simple adjustment at the control station. This adjustment also permits control of the extent of the throttle opening to be permitted before the clutch is engaged as when operating the two handles simultaneously.

In the use of the device of the present invention in its simplest form, assuming the control handle is in neutral position and it is desired to go ahead, both handles are pushed forward together. During the first part of the movement the clutch is shifted to forward position and the throttle is open slightly, then when it is desired to increase the speed the throttle lever alone is pushed forwardly the desired amount, the clutch lever remaining behind. When it is desired to disconnect the clutch, when going ahead at advanced speed, the operator reaches his hand across the path of the two handles and engages the most advanced one, which is the throttle handle, and moves that rearwardly until the hand engages the clutch handle and then both handles are moved rearwardly together to neutral position. If the next manuever immediately to be made is to astern, the rearward motion of the two handles is continued until the clutch handle again stops at the limit of its movement, and by further movement by the hand remaining on the throttle handle the engine may be accelerated. These are natural operations and if performed in the above manner no damage can be done by the premature opening or engagement of the clutch while the engine is turning over too fast.

To guard against careless operation and to avoid an inexperienced operator making improper maneuvers such as moving the clutch lever alone to neutral position while the engine is turning over too fast, or trying to engage the clutch when the engine is turning over too fast, the present invention provides an automatic interlock mechanism between the two control levers. For this purpose there is provided, when required, a blocking device between the throttle control segment and the clutch segment so that the latter cannot be shifted from or into clutch engaging position while the throttle control segment is out of idling position. With this interlock, should the operator attempt to move the clutch control handle while the throttle control handle is in open throttle position, he will be prevented from doing so until he moves the throttle handle to idling position. Thus the operator cannot proceed from advanced speed ahead to advanced speed astern without moving the throttle control handle first to safe shifting position, then the clutch control handle through neutral to reverse position, and then moving the throttle to advanced position.

According to the present invention, the interlock between the throttle and clutch levers permits movement of the throttle lever to advanced position while the clutch lever is in neutral position, so that the engine may be warmed up or tested while the clutch is in neutral position.

The range of permissible movement which the throttle handle may have in so-called "idling" position without locking the clutch control handle against movement may, according to circumstances, vary from very little to a substantial amount depending on the safe engine speed at which clutch shifting may be effected. In some circumstances the throttle lever may move for as large an arc as would be required of the clutch lever to operate the clutch, due to the slow response of the push-pull cable connected to the throttle to the arcuate movement of the throttle handle either with or without the provision of lost motion between the throttle segment and the push-pull cable.

Thus the device of the present invention may be arranged for use with a gasoline engine where considerable latitude of opening movement of the throttle may be permitted before the clutch is engaged, or with a diesel-type engine where little or no opening movement of the throttle is needed before the clutch is engaged for either forward or reverse direction, since with a diesel-type engine the throttle may normally be in clutch shifting position, other means such as the governor being provided, to maintain the proper engine speed while the clutches are being shifted.

Other features and advantages will hereinafter appear.

In the accompanying drawings:

Figure 1 is a perspective view of the improved control device of this invention showing the connections to the throttle of the engine and to the clutch and reverse gear of the engine.

Fig. 2 is a vertical section showing the clutch-reverse lever and connections of a form of this invention in which no interlock is provided between the throttle and clutch lever.

Fig. 3 is a transverse vertical sectional view of the form of my invention shown in Figs. 2 and 4.

Fig. 4 is a view similar to Fig. 3, showing the throttle control lever and connections.

Fig. 5 is a view similar to Fig. 4, but showing interlock mechanism of the present invention.

Fig. 6 is a vertical section taken substantially on the line 6—6 of Fig. 5.

Fig. 7 is a fragmentary transverse section showing the parts in the position shown in Fig. 8.

Fig. 8 is a view similar to Fig. 5 showing the positions of the parts when the throttle and clutch levers have been moved to clutch shifting position, the further permissible movement of the throttle lever being indicated by dot-and-dash lines.

Fig. 9 is a view similar to Fig. 5 showing the interlock arranged to prevent movement of the clutch lever when the throttle moves even a slight distance from vertical position.

Fig. 10 is a view like Fig. 7 showing the interlock rendered inoperative by removal of the locking pin.

Referring to Figs. 1 through 4 the improved control device of this invention, as adapted for marine use, comprises a housing 20 of the type which may be readily mounted on the bridge of a vessel. Leading to the housing 20 is a push-pull cable 21 which is connected to a lever 22 of a clutch control valve 23 of the type commonly used with hydraulic reverse gears. As is well understood, the valve 23 may have four hydraulic connections 24, 25, 26 and 27 leading respectively to the pump, the "ahead" cylinder, the pump return or neutral, and the "astern" cylinder. The valve lever 22 is movable from a neutral position as shown in Fig. 1, forward or rearward to operating positions, as indicated by the arrows.

A second push-pull cable 28 leads to the housing 20 and at its other end is connected with a throttle lever 29 of an engine 30, the throttle lever 29 being capable of counterclockwise advancing or opening movement as indicated by the arrow.

In accordance with the present invention, the housing 20 is provided with a clutch control lever 31 and a throttle control lever 32, said levers being pivotally mounted on opposite sides of the housing, extending upward therefrom and having knobs 33 and 34 respectively, which are juxtaposed when the levers are upright so that they may be gripped and moved in unison by a straight line movement with one hand, or one may be advanced relative to the other by a twisting movement of the same hand.

The upright positions of the levers 31 and 32 correspond to their neutral positions, wherein the clutch is disengaged and the throttle is at idling position. Both control levers 31 and 32 are preferably movable in both directions from the neutral positions shown in Fig. 1, as indicated by the arrows and the connections are so made to them that the handles 33 and 34 will move from neutral position, forwardly for travel ahead and rearwardly for movement astern.

Referring to Figs. 2 and 3, the clutch lever 31 is carried on a shaft 35 which extends into the housing 20 and at its inner end mounts on a semicircular segment 36 carrying at one extremity a fitting 37 connected with the operating rod 38 of the push-pull cable 21 connected to the hydraulic valve lever 22 for controlling the clutch-reverse mechanism 23.

The throttle lever 32 (Figs. 3 and 4) is carried on a shaft 39 which extends into the housing 20 and at its inner end mounts a semicircular segment 40 having intermediate its ends a fitting 41 connected with the operating rod 42 of the push-pull cable 28 leading to the engine throttle 29.

When the clutch lever 31 is shifted either forwardly or backwardly from the upright neutral position shown in Figs. 1, 2 and 3, it will either push or pull the rod 38 and thus swing the clutch valve lever 22 either to the left or to the right as shown, causing the reverse gear of the engine to be engaged in either reverse or ahead position. When the throttle lever 32 is shifted either forwardly or backwardly from the neutral or idling position shown in Figs. 1, 3 and 4, it will pull the rod 42 and thus cause the throttle 29 to be advanced. This is because the rod 42 for the throttle is connected at the bottom of the segment 40 from which position sufficient movement of the segment in either direction will cause the operating element 42 to be raised thus opening the throttle more or less depending on the extent of movement of the segment 40.

The segment 36 for the clutch and reverse gear may be provided with two holes or mounting sockets 36a, one at each side of the center. As shown in Fig. 3 the operating mechanism 38 has the fitting 37 mounted in the socket 36a at the right hand side of the segment so that when the clutch control lever 31 is swung clockwise it will push the operating rod 38 downwardly to operate the clutch and will thus move the clutch control lever 22 to the right, this being the movement required for movement of the vessel ahead for the particular installation. However, in some installations of engines the lever 22 will have to move counterclockwise for the ahead position and to accommodate the control of the present invention to this variation the fitting 37 for the operating connection 38 is removed from the right-hand socket 36a (Fig. 3) and placed in the left-hand socket 36a, as shown in dot-and-dash lines in Fig. 3. Thus the clockwise movement of the lever 31 would pull the operating rod 38 upwardly and move the lever 23 to the left.

In order to reduce the cost of manufacture, the segments 36 and 40 may be identical, each having the pair of holes 36a and the intermediate hole 36 so that the same part can be used for either clutch or throttle operation.

The shafts 35 and 39 of the levers 31 and 32 are preferably substantially in alignment with each other, whereby the handle portions 33 and 34 of the levers follow semicircular paths extending alongside each other. Also, the upper parts of the levers 31 and 32 preferably extend angularly inwardly or toward each other, to locate the handle portions 33 and 34 close to each other when the levers are upright, whereby both handle portions may be grasped by one hand and the levers operated simultaneously in the same directions either away from or toward the operator for either forward or astern operation respectively. This is of considerable advantage in a marine installation, in providing for quick maneuverability of the craft.

The dual control of the present invention may be so arranged that, in response to simultaneous equal single handed operation of the clutch and throttle levers 31 and 32, the clutch will be actuated prior to the engine attaining any speed substantially greater than that at which the clutch shifting should be effected. For instance, as shown in Fig. 4, by having the throttle operating rod 42 as the lowest part of the segment 40 when the lever 32 is upright, the initial movement of the throttle lever 32, say through an arc of 30 degrees, will not cause any appreciable raising movement of the throttle opening rod 42. In sharp contrast to this, the same initial movement of the clutch member 31 (Fig. 3) will cause a relatively great raising or lowering movement of the rod 38, enough to move the clutch lever 22 to clutch operating position.

In the event that such initial movement of the segment 40 and lever 32 would move the rod 42 to an extent sufficient to speed up the engine excessively, nut 42a may be adjusted on the threaded end of the rod 42 to provide a desired amount of lost motion. With the dual control of the present invention thus arranged, one hand control of the levers 31 and 32 is possible without imposing an undesirable load on the clutch, such as might be occasioned if the engine were speeded up excessively prior to the clutch being engaged.

In twin-engine installations, the adjustment provided by the nut 42a on the end of the rod 42 may be employed to synchronize speed of the two engines while the levers 32 are in the same arcuate positions.

For the experienced operator, and when emergencies or sudden operations of the clutch and throttle are the exception, the clutch and throttle control above described may be used without other means for assuring the proper sequence of operations in making maneuvers.

However, to prevent improper and dangerous operation of the control levers by an inexperienced operator, or even by an experienced operator under adverse conditions, in my copending application, Serial No. 133,623, of which this application is a continuation in part, now Patent No. 2,716,474, dated August 30, 1955, I have disclosed several arrangements for preventing the improper movement of one of the control levers until its companion lever has been properly positioned.

In the embodiment of my invention disclosed and claimed herein such means are provided for preventing the movement of the clutch control lever from neutral or "disengaged" position to either ahead or astern positions, or from either of the latter to neutral position whenever the throttle lever is in a position where the engine speed is too great for safe operation of the clutch and reverse gear and yet, without additional manual operations, permit advancing movement of the throttle lever beyond safe operating speeds (as is often desired for the purpose of warming up the engine or testing or adjusting it) when the clutch control lever is in neutral position. For this purpose, as shown in Figs. 5 to 8 there is mounted on a shaft 50 carried by the frame 20 an interlock arm 51 carrying a pin 52 on its inner end having a circular projection 53, and on its other end semi-circular projections 54.

The segment 40 of the throttle lever 32 carries laterally offset therefrom a second semicircular sector 55 having a notch 56 in its lower center portion, adapted to receive the semicircular end 54 of the locking pin 52. The sector 36 of the clutch lever 31 carries a semicircular sector 57, having a flange 58 provided with three spaced semicircular notches 59 in its inner surface to receive the circular end 53 of the locking pin 52.

The parts just described are so arranged that when the interlock arm 51 is in its normal lowered position, shown in Figs. 5 and 6, the pin-end 53 is in the notch 59 in the clutch segment 36 while the pin-end 54 is out of the notch 56 in the throttle segment 55. Thus the throttle lever may be moved either forward or backward from idling position to speed up the engine, as when warming up. However, when the throttle lever 32 has been moved from its upright idling position to a point at which the notch or opening 56 is no longer above the pin-end 54, the locking arm will be prevented from being raised by the camming action of the notch 59 in which the pin-end 53 is located because the pin-end 54 strikes the surface of the segment 55. As a consequence the clutch lever 31 will be locked in neutral position until the throttle lever is returned to "idling position." As soon as this occurs the pin-end 54 and the notch 56 are aligned, the clutch member may be moved since the pin-end 53 may be cammed out of the notch 59 and the pin-end 54 may extend into the notch 56. When the clutch lever is moved to clutch engaging position either forward or astern the pin-end 53 again drops into a notch 59 thus freeing the pin-end 54 from the notch 56 thereby permitting the acceleration of the engine and forward or reverse travel of the vessel. As shown in Fig. 9, the notch 56 in the throttle lever may be narrow so that when the pin-end 54 is raised it permits virtually no movement of the throttle lever and this arrangement may be employed advantageously in connection with diesel engines, as above set out, in which other means are provided for maintaining proper engine speed while operating the clutches.

As shown in Fig. 8, the notch 56 is quite wide thereby permitting the throttle lever to be advanced along with the clutch lever. The arcuate movement permitted by the throttle lever during the shifting of the clutch lever may be such as to accelerate the engine only sufficiently to permit engagement of the clutch either ahead or astern without stalling the engine and the degree of throttle opening during this movement of the throttle lever may be controlled by adjusting the nut 42a on the rod 42.

If desired, the pin 52 of the interlock mechanism shown in Figs. 5 to 9 may be omitted, as illustrated in Fig. 10, in which case the throttle lever and clutch levers may be actuated independently of the other, without benefit of the interlock. Such organization is for use for experienced operators, and enables simultaneous actuation of the levers 31 and 32 to be effected by one hand, as described previously, when the equipment is properly set up for such.

While I have disclosed in Fig. 2 one way of accommodating the control of the present invention to engine installations which require either a pulling on the cable or a pushing on the cable to operate the reverse gear for forward direction, it should be understood that it is not necessary to shift the swivel fitting 37 from one hole to the other in the segment 36; instead the entire control may be rotated through an angle of 180 degrees. This is possible because the throttle lever 31 moves from vertical or neutral position in either of the two directions to advance the throttle.

To hold the control levers 31 and 32 in vertical or neutral position, shown in Figs. 2, 3 and 4, the present invention provides a detent mechanism which includes a detent 60 riding in a recess 61 in the frame and normally urged outwardly by a spring 62. The upper end of the detent is pointed and fits in a notch 63 in the control lever segment.

This application is a continuation in part of my co-pending application Serial No. 133,623, filed December 17, 1949.

Variations and modifications may be made within the scope of the claims and portions of the improvements may be used without others.

I claim:

1. For use with a primer mover, having a throttle for controlling its speed of rotation and having a clutch-reverse gear for controlling the direction of rotation of the prime mover's output shaft; a combined throttle and clutch control device comprising a base; a pair of throttle and clutch control members having handles for manual operation; means for mounting said members on the base, whereby the operating handles are movable in adjacent, substantially parallel paths, said control members and associated handles being movable in either of opposite directions from a common neutral or normal position; push-pull links for connecting said control members with the clutch-reverse gear and the throttle of the prime mover; connecting means between the throttle control member and the throttle link providing for axial movement of the throttle link in throttle opening direction when the throttle control member is moved in either of opposite directions from its neutral or normal position; and connecting means between the clutch-reverse gear control member and the clutch-reverse gear link; providing for axial movement of the clutch-reverse gear link in either of opposite directions from its neutral or normal position, said handles being positionable for simultaneous gripping by one hand whereby they both may be simultaneously moved in the same direction from said neutral or normal position by said one hand to either forward or reverse position to simultaneously engage the clutch-reverse gear and open the throttle.

2. For use with a prime mover, having a throttle for controlling its speed of rotation and having a clutch-reverse gear for controlling the direction of rotation of the prime movers output shaft; a combined throttle and clutch control device comprising a base; a pair of throttle and clutch control members having handles for manual operation; means for mounting said members on the base, whereby the operating handles are movable in adjacent, substantially parallel paths, said control members and associated handles being movable in either of opposite directions from a common neutral or normal position; push-pull links for connecting said control members with the clutch-reverse gear and the throttle of the prime mover; connecting means between the throttle control member and the throttle link providing for axial movement of the throttle link in throttle opening direction when the throttle control member is moved in either of opposite directions from its neutral or normal position; and connecting means between the clutch-reverse gear control member and the clutch-reverse gear link, providing for axial movement of the clutch-reverse gear link in either of opposite directions from its neutral or normal position, said handles being positionable for simultaneous gripping by one hand whereby they both may be unidirectionally moved from said neutral or normal position to engage the clutch-reverse gear for forward or reverse engagement and to simultaneously open the throttle.

3. For use with a prime mover, having a throttle for controlling its speed of rotation and having a clutch-reverse gear for controlling the direction of rotation of the prime movers output shaft; a combined throttle and clutch control device comprising a base; a pair of throttle and clutch control members having handles for manual operation; means for mounting said members on the base, whereby the operating handles are movable in adjacent, substantially parallel paths, said control members and associated handles being movable in either of opposite directions from a common neutral or normal position; push-pull links for connecting said control members with the clutch-reverse gear and the throttle of the prime mover; connecting means between the throttle control member and the throttle link providing for axial movement of the throttle link in throttle opening direction when the throttle control member is moved in either of opposite directions from its neutral or normal position; connecting means between the clutch-reverse gear control member and the clutch-reverse gear link, providing for axial movement of the clutch-reverse gear link in either of opposite directions from its neutral or normal position; and means providing for the reversal of direction of movement of the clutch-reverse gear control link whereby forward movement of the clutch-reverse gear control member will produce either forward or reverse movement of the clutch-reverse gear control link, and whereby reverse movement of the clutch-reverse gear control member will produce either forward or reverse movement of the clutch-reverse gear control link as may be desired.

4. A combined reverse-gear and throttle control having a pair of handles movable in either of opposite directions from a neutral position, said handles being arranged for simultaneous gripping by one hand whereby they may be simultaneously moved in the same direction from said neutral position; means for actuating a reverse gear for forward or reverse operation in response to movement of one handle from neutral position respectively in either of said opposite directions; and means for opening a throttle in response to movement of the other handle in either of opposite directions from said neutral position.

5. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position respectively in either of said opposite directions; and means for opening a throttle in response to movement of the other handle in either of opposite directions from said neutral position, said last-named means including a lost-motion device whereby the opening of the throttle is delayed until a determinate amount of movement of the throttle control handle has been effected.

6. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position respectively in either of said opposite directions; and means for opening a throttle in response to movement of the other handle in either of opposite directions from said neutral position, said last-named means including an adjustable lost-motion device whereby the opening of the throttle may be delayed until a predetermined amount of movement of the throttle control handle has been effected.

7. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position to determinate positions respectively at opposite sides of said neutral position; and means for opening a throttle in response to movement of the other handle in either of opposite directions from said neutral position, said last-named means being constructed and arranged to restrict opening of the throttle to that providing safe gear-shifting speeds of the engine when the throttle control handle reaches a position opposite said determinate position of the reverse-gear control handle, whereby the two handles may be moved in unison from neutral to gear-engaging position.

8. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position to determinate positions respectively at opposite sides of said neutral position; means for opening a throttle in response to movement of the other handle in either of opposite directions from said neutral position; and a mechanical interlock between said two handles normally inoperative to lock either handle against movement and including means actuated by the throttle control handle for preventing movement of said reverse-gear control handle from neutral position to either of said determinate positions when the throttle control handle is in position in which the throttle is open to an extent producing engine speeds in excess of those at which safe operation of the reverse-gear may be performed.

9. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position to determinate positions respectively at opposite sides of said neutral position; means for opening a throttle in response to movement of the other handle in either of opposite directions from said neutral position; and a mechanical interlock between said two handles normally inoperative to lock either handle against movement and including means actuated by the throttle control handle for preventing movement of said reverse-gear control handle from either of said determinate positions to neutral position when the throttle control handle is in position in which the throttle is open to an extent producing engine speeds in excess of those at which safe operation of the reverse-gear may be performed.

10. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position to determinate positions respectively at opposite sides of said neutral position; means for opening a throttle in response to movement of the other handle in either of opposite directions from said neutral position; and a mechanical interlock between said two handles normally inoperative to lock either handle against movement and including means actuated by the throttle control handle for preventing movement of said reverse-gear control handle from neutral position to either of said determinate positions or from either of the latter to neutral position when the throttle control handle is in position in which the throttle is open to an extent producing engine speeds in excess of those at which safe operation of the reverse-gear may be performed.

11. A combined reverse-gear and throttle control having a pair of handles movable in either of opposite directions from a neutral position, said handles being arranged for simultaneous gripping by one hand whereby they may be simultaneously moved in the same directions from said neutral position; means for actuating a reverse gear for forward or reverse operation in response to movement of one handle from neutral position to determinate positions respectively at opposite sides of said neutral positions; means for opening a throttle in response to movement of the other handle in either of opposite directions from said neutral position, said last-named means being constructed and arranged to restrict opening of the throttle to that providing safe gear-shifting speeds of the engine when the throttle control handle reaches a position opposite said determinate position of the reverse-gear control handle whereby the two handles may be moved in unison from neutral to gear-engaging position; and a mechanical interlock between said two handles normally inoperative to lock either handle against movement and including means actuated by the throttle control handle for preventing movement of said reverse-gear control handle when the throttle lever is positioned beyond that opposite said determinate positions of the reverse-gear control handle.

12. A combined reverse-gear and throttle control having a pair of handles each movable in either of opposite directions from a neutral position; means for actuating a reverse gear for forward or reverse operation in response to movement of one handle from neutral position to determinate positions at opposite sides of said neutral position; means for opening a throttle in response to movement of the other handle in either of opposite directions from said neutral position; and a mechanical interlock between said two handles normally inoperative to lock either handle against movement and including means actuated by the throttle control handle for preventing movement of said reverse-gear control handle from neutral position to either of said determinate positions when the throttle control handle is in position in which the throttle is open to an extent producing engine speeds in excess of those at which safe operation of the reverse-gear may be performed.

13. A combined reverse-gear and throttle control having a pair of handles each movable in either of opposite directions from a neutral position; means for actuating a reverse-gear for forward or reverse operation in response to movement of one handle from neutral position to determinate positions at opposite sides of said neutral positions; means for opening a throttle in response to movement of the other handle in either of opposite directions from said neutral position; and a mechanical interlock between said two handles normally inoperative to lock either handle against movement and including means actuated by the throttle control handle for preventing movement of said reverse-gear control handle when the throttle control handle is out of neutral position.

14. A combined clutch and throttle control device for use with an engine having a throttle, reverse gear and clutch means, comprising a base; manually operable clutch and throttle levers mounted on said base and movable from neutral inoperative positions in either of opposite directions to either of two operative positions; means for connecting said levers respectively to said clutch and throttle means to actuate the same; a semi-circular sector carried by the throttle lever, having a notch in its periphery, substantially at the center; a semicircular sector carried by the clutch lever, having a flange extending along its periphery, said flange having three notches on its inner surface; and means controlled by the sector carried on the throttle lever and including a pin movably carried by the base and receivable in all of said notches for releasably locking the sector carried by the clutch lever to maintain the latter in neutral position when the throttle lever is in operative position, said means releasing the clutch lever and sector thereof for movement whenever the throttle lever is in neutral position.

15. A combined clutch and throttle control device for use with an engine having a throttle, reverse gear and clutch means, comprising a housing; manually operable clutch and throttle levers mounted on said housing, said clutch lever being movable from a neutral position in either of opposite directions to either forward or reverse position and said throttle lever being movable between idling and operating positions; rotary segments in said housing connected respectively to said levers; means for connecting said levers respectively to the clutch means and throttle to actuate the same; and locking means engageable with said segments and controlled by said throttle lever when in operating position locking the clutch lever in forward or reverse position, said locking means releasing the clutch lever when said throttle lever is returned to idling position.

16. A combined clutch and throttle control device for use with an engine having a throttle, reverse gear and clutch means, comprising a housing; manually operable clutch and throttle levers mounted on said housing, said clutch lever being movable from a neutral position in either of opposite directions to forward or reverse position and said throttle lever being movable between idling and operating positions; rotary segments in said housing connected respectively to said levers; means for connecting said one and other levers respectively to the clutch means and throttle to actuate the same; and locking means engageable with said segments and controlled by the throttle lever releasably locking the clutch lever in neutral position when the throttle lever is in operating position, said locking means releasing the clutch lever for movement whenever the throttle lever is in idling position.

17. A combined clutch and throttle control device for use with an engine having a throttle, reverse gear and clutch means, comprising a housing; manually operable clutch and throttle levers mounted on said housing, said clutch lever being movable from a neutral position in either of opposite directions to forward or reverse position and said throttle lever being movable from idling position in either of opposite directions to operating positions; rotary segments in said housing connected respectively to said levers; means for connecting said one and other levers respectively to the clutch means and throttle to actuate the same; and locking means engageable with said segments and controlled by the throttle lever releasably locking the clutch lever in either its forward or reverse position when the throttle lever is in operating position, said locking means releasing the clutch lever for movement whenever the throttle lever is in idling position.

18. A combined clutch and throttle control device for use with an engine having a throttle, reverse gear and clutch means, comprising a housing; manually operable clutch and throttle levers mounted on said housing, said clutch lever being movable from a neutral position in either of opposite directions to forward or reverse position and said throttle lever being movable from idling position in either of opposite directions to operating positions; rotary segments in said housing connected respectively to said levers; means for connecting said one and other levers respectively to the clutch means and throttle to actuate the same; and locking means engageable with said segments and controlled by the throttle lever releasably locking the clutch lever in one of its neutral, forward or reverse positions when the throttle lever is in operating position, said locking means releasing the clutch lever for movement whenever the throttle lever is in idling position.

19. A combined clutch and throttle control device for use with an engine having a throttle, reverse gear and clutch means, comprising a housing; manually operable clutch and throttle levers mounted on said housing, said clutch lever being movable from a neutral position in either of opposite directions to forward or reverse position and said throttle lever being movable from idling position in either of opposite directions to operating positions; rotary segments in said housing connected respectively to said levers; means for connecting said one and other levers respectively to the clutch means and throttle to actuate the same; and locking means engageable with said segments and controlled by the throttle lever releasably locking the clutch lever in its forward or reverse position when the throttle lever is in operating position, said locking means releasing the clutch lever for movement whenever the throttle lever is in idling position, and including a pivoted blocking member movable on the housing in reverse directions and pin-and-slot connection means between said member and the clutch and throttle levers.

20. A combination clutch and throttle control for marine engines having a manually engageable and operable clutch control lever and a separately manually engageable and operable throttle control lever coaxially mounted adjacent to each other in one housing, including interlocking means whereby the throttle control lever is prevented from movement unless the clutch control lever is in neutral, ahead or astern position.

21. In a combination clutch and throttle control for marine engines and the like having a clutch control lever and a throttle control lever mounted adjacent to each other in one housing, including interlocking means, said throttle control lever having an engine idling position and engine operating positions, said interlocking means being constructed and arranged to effect operation of the interlock at a predetermined engine operating position of the throttle control lever beyond said engine idling position.

References Cited in the file of this patent

UNITED STATES PATENTS

| Number | Name | Date |
| --- | --- | --- |
| 708,724 | Merrick et al. | Sept. 9, 1902 |
| 2,163,895 | Staples | June 27, 1939 |
| 2,326,796 | Panish | Aug. 17, 1943 |
| 2,338,404 | Carroll | Jan. 4, 1944 |
| 2,404,951 | Donaldson | July 30, 1946 |
| 2,407,877 | Good | Sept. 17, 1946 |
| 2,442,509 | Panish | June 1, 1948 |
| 2,444,364 | Panish | June 29, 1948 |
| 2,519,080 | Simpson | Aug. 15, 1950 |
| 2,534,729 | Panish | Dec. 19, 1950 |
| 2,587,875 | Moore et al. | Mar. 4, 1952 |